United States Patent [19]

Papalos

[11] 3,918,983

[45] Nov. 11, 1975

[54] SULFATED CASTOR OIL SUBSTITUTE AND ITS USE IN TEXTILE TREATMENT

[75] Inventor: John G. Papalos, Ledgewood, N.J.

[73] Assignee: Diamond Shamrock Corporation, Cleveland, Ohio

[22] Filed: Jan. 28, 1974

[21] Appl. No.: 437,053

[52] U.S. Cl. ............ 106/244; 106/249; 117/139.5 F
[51] Int. Cl.² ........................................... C08L 91/00
[58] Field of Search ....... 106/249, 244; 117/139.5 F

[56] References Cited
UNITED STATES PATENTS

| | | | |
|---|---|---|---|
| 2,025,989 | 12/1935 | Kaplan | 117/139.5 F |
| 2,229,975 | 1/1941 | Kaplan | 117/139.5 F |
| 3,764,358 | 10/1973 | Papalos | 106/249 |

*Primary Examiner*—Theodore Morris
*Attorney, Agent, or Firm*—Roy Davis; Neal T. Levin; Leslie G. Nunn, Jr.

[57] ABSTRACT

A sulfated castor oil substitute is prepared by sulfating a mixture of alcohol and unsaturated oils. This product is useful as a textile softener.

8 Claims, No Drawings

SULFATED CASTOR OIL SUBSTITUTE AND ITS USE IN TEXTILE TREATMENT

BACKGROUND OF THE INVENTION

1. Field of the Invention

This invention relates to sulfated mixtures of alcohols and unsaturated oils and use of these mixtures as sulfated castor oil substitutes in textile treatment.

2. Description of the Prior Art

According to Trask in The Journal of the American Oil Chemists' Society, vol. 33, pp. 568–571 (1956) sulfated castor oil was first prepared in 1870 and was used in the textile industry. The product was called "Turkey Red Oil" since it permitted the textile industry for the first time to obtain a bright red color in the dye bath, a color which had been impossible with the soaps available up to that time. Numerous other uses have been found for Turkey Red Oil since its discovery. Turkey Red Oil is prepared by adding concentrated sulfuric acid (93%) to castor oil at 25°–30°C. From about 15 to 30% sulfuric acid is added to the castor oil. After all of the acid has been added and reaction is complete, the reaction product is washed with water and then neutralized with sodium hydroxide solution. The main reaction is sulfation, i.e., the esterification of the hydroxyl group of ricinoleic acid to $-OSO_3H$. A second reaction, addition of $-H$ and $-OSO_3H$ at the double bond, proceeds much more slowly. Other reactions such as sulfonation ($C-H \rightarrow C-SO_3H$) undoubtedly occur but to a minor degree.

During recent years, castor oil has been in short supply from time to time due to crop failures. There is a definite need for substitute castor oil products based on readily available raw materials.

SUMMARY OF THE INVENTION

A substitute for sulfated castor oil is prepared by sulfating a mixture of a. from about 10% to about 70% by weight of at least one aliphatic alcohol having from about 4 to about 30 carbon atoms and b. from about 90% to about 30% by weight of at least one unsaturated oil other than castor oil.

The sulfated mixture is useful as a softener for textiles.

DESCRIPTION OF THE PREFERRED EMBODIMENTS

The sulfated castor oil substitutes described in this application may be obtained by sulfating mixtures of aliphatic alcohols having from about 4 to about 30 carbon atoms and unsaturated vegetable or animal oils. These castor oil substitutes may be prepared by sulfating mixtures containing from about 10% to about 70% by weight of aliphatic alcohols and from about 90% to about 30% by weight of unsaturated oil with the preferred mixtures containing from about 20% to about 60% by weight of the aliphatic alcohols and from about 80% to about 40% by weight of unsaturated oil.

These mixtures may contain saturated or unsaturated, branched or linear, monohydric or dihydric alcohols such as butyl, isobutyl, amyl, hexyl, heptyl, ethylhexyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl, the corresponding secondary and tertiary alcohols, such as secondary amyl alcohol and tertiary butyl alcohol, their isomers, their analagous mono- and polyunsaturates, their mixtures and the like. Useful alcohols include those produced by hydrogenation of fatty acids or glycerides obtained from animal or vegetable oils and waxes such as coconut oil, tall oil, tallow oil or the like. Other alcohols can be produced by the *Oxo process*. This process involves catalytic reaction of alpha-olefins with carbon monoxide and hydrogen under pressure to obtain primary aliphatic alcohols having branched chains. Oxo alcohols include i-octyl, decyl, tridecyl, pentadecyl, their mixtures and the like. Other primary aliphatic alcohols include those produced by the polymerization of ethylene with Ziegler type catalysts and subsequent reaction of the metal alkyls formed in this polymerization to obtain mixtures of straight chain primary alcohols. These alcohols can be used as mixtures or as specific primary alcohols such as hexyl, octyl, and decyl and may be mixtures of or individual primary alcohols having chain lengths of from about eight to about twenty eight carbon atoms.

Preferred alcohols have a backbone of from 8 to 22 carbon atoms, are monohydric, primary, and may be unsaturated. Preferred alcohols include mixtures comprising $C_{8-16}$ Oxo process bottoms, both branched and linear.

Useful unsaturated oils include those having an iodine value of over 60 and include, but are not limited to: vegetable oils such as acorn, almond, apricot kernel, beechnut, black mustard, brazil nut, candlenut, cashew nut shell, chaulmoogra, corn, cottonseed, croton, ergot, grape seed, hazelnut, hemp seed, jute seed, laurel, lemon, linseed, oat, olive, peach kernel, peanut, pecan kernel, perilla, pistachio nut, plum kernel, poppy seed, pumpkin seed, rape seed, rice bran, safflower, sesame, soya, sunflower, tung, walnut, wheat, and mustard seed; animal oils such as lard-oil and neatsfoot, and fish oils such as cod liver, dogfish, herring, menhaden, sardine and shark.

Preferred unsaturated oils include those having an iodine value over 90, for example, cod liver, corn, cottonseed, croton, hemp seed, herring, lemon, linseed, peanut, pecan, rape seed, rice bran and teaseed.

The compositions of this invention may be substituted for sulfated castor oil in any formulation where this material is used as a fabric softener or may be used as fabric softeners by themselves. When used in a formulation with mineral oil, the compositions can carry over 60% mineral oil and up to the amount carried by sulfated natural castor oil. Thus, these compositions impart to fibers more softness, more surface feel, more light fastness. One part of these compositions can carry up to four parts of mineral oil.

These sulfated compositions may be used in separate final treatments as textile softeners to improve the handle and feel of finished textiles. Use of these compositions in finishing of textiles is desirable. For example, in the processing of cotton textiles, vegetable waxes are removed in boilingout, bleaching, dyeing so a finishing agent such as these sulfated castor oil substitutes must be added as the final finish to the goods to improve the somewhat harsh hand after wet processing. The sulfated compositions may be used on textile materials derived from natural, manmade and synthetic fibers such as cotton, wool, silk, jute, sisal, hemp, fur, flax, kapok, rayon, cellulose acetate, cellulose triacetate, polyamides such as nylon, polyesters such as polyethylene terephthalate (Dacron), acrylics such as polyacrylonitrile, vinyl resins such as copolymers of polyvinyl chloride and polyvinyl acetate, copolymers of vinylidene chloride and vinyl chloride, copolymers of acrylonitrile and vinyl chloride and the like, polystyrene, polyethylene, polypropylene, polyurethanes, glass, protein fibers such as vicara and peanut, blends of these fibers and the like.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g, l °C, °F, hr, in, are used to indicate grams, liters, degrees Centigrade, degrees Fahrenheit, hours, inches respectively, in these examples.

Example I

A reactor was charged with 50 parts by weight of refined mustard seed oil and 50 parts by weight of $C_{8-16}$ alcohols (Oxo process bottoms containing both branched and linear alcohols). A total of 30 parts by weight of 98% sulfuric acid was added to the charge in the reactor over 1 hour while maintaining the reaction temperature at about 10° to about 20°C.

The reaction mixture was reacted for an additional hour at this temperature and then dropped into 200 parts by weight of wash water containing 20 parts by weight of salt at 35°C and allowed to stand in the brine wash water for about 45 minutes. At the end of this period, the wash water was drawn off of the reaction product and the product neutralized to a total acid value of 20–30, then, adjusted with 50% sodium hydroxide solution to an alkalinity of 0.25% as KOH and allowed to stand overnight. If necessary, the product was allowed to stand longer until a moisture value of 25% or less was obtained. Additional 50% sodium hydroxide solution was then added to clarify the product. The reaction product, which was the desired sulfated castor oil substitute, was bleached and stabilized.

The reaction product was a clear amber liquid at 25°C. It was readily miscible at 10% by weight (as is) in water at 25°C and formed a 10% by weight emulsion (as is) which was stable for more than 2 weeks at 25°C. These data are shown in Table I below together with comparable data for a commercial sulfated castor oil.

Example II

The reactor was charged with 70 parts by weight of crude peanut oil and 30 parts by weight $C_{8-16}$ alcohols (Oxo process bottoms containing both branched and linear alcohols). A total of 30 parts by weight of 98% sulfuric acid was added to the charge in the reactor while maintaining the reaction temperature at about 10° to about 20°C.

The reaction mixture was reacted for an additional hour at this temperature and then dropped into 200 parts by weight of wash water containing 20 parts by weight of salt at 35°C. The reaction mixture allowed to stand in the brine wash water for about 45 minutes. At the end of this period, the wash water was drawn off of the reaction product and the product was neutralized to an acid value of 40–45. The product was then adjusted with 50% sodium hydroxide solution to an alkalinity of 0.25% as KOH and then allowed to stand overnight. If necessary, the product was allowed to stand longer until a moisture value of 25% or less was obtained. The reaction product was then bleached and stabilized.

The reaction product was a cloudy amber liquid at 25°C. It was readily miscible at 10% by weight (as is) in water at 25°C and formed a 10% by weight emulsion (as is) which was stable for more than two weeks at 25°C. These data are given in Table I below.

TABLE I

| Product | Reaction Product of Example I | Reaction Product of Example II | Commercial Sulfated Castor Oil |
|---|---|---|---|
| Appearance as is at 25°C | clear amber liquid | cloudy amber liquid | clear amber liquid |
| 10% solubility in water at 25°C | readily miscible | readily miscible | readily miscible |
| Stability of 10% emulsion in water at 25°C | stable for more than 2 wks | stable for more than 2 wks | stable for more than 2 wks |

Example III

This example describes the evaluation of the sulfated castor oil substitutes prepared in Examples I and II.

Preparation of Fabric Samples

The sulfated castor oil substitutes prepared in Example I, Example II and a commercial sulfated castor oil were evaluated using cut 4 in × 12 in finish free fabric samples of 100% unmercerized cotton, 50/50 polyester/cotton blend and 100% nylon semi-dull taffeta. Fabric samples were weighed and then 3% by weight solids of the sulfated castor oil substitutes prepared in Examples I and II and the commercial sulfated castor oil respectively were applied as finishes to individual fabric samples. The sulfated castor oil from Examples I and II and the commercial sulfated castor oil were first diluted with sufficient water to obtain finish baths which gave 3% solids wet pickup. Each of the fabric samples was immersed once in the finish bath and then squeezed once between rollers to obtain the desired 3% solids wet pickup. Each fabric sample was then horizontally restrained on a tenter frame and dried in a forced draft oven at 225°F in order to obtain uniform distribution of the finish on the fabric.

Scorch Test at 400°F

This test was performed using the 100% cotton and 50/50 polyester/cotton blend fabric samples prepared above. These samples had 3% of the sulfated castor oil substitute from Examples I and II as finishes. The samples were placed between heated (400°F) plates of the AATCC scorch tester (Atlas Electric Industries, Inc., Chicago, Illinois). A 1,000 g weight was placed on top of the tester to maintain constant pressure of the samples. Samples were held between the plates in this manner for 180 seconds. After treatment the samples were compared visually for the degree of scorching as compared with a blank which was not treated with a sulfated castor oil substitute. The results are set forth in Table II and show that cotton fabric treated the Reaction Products of Examples I and II as well as the blank produced a slight degree of scorch at 400°F.

TABLE II

Scorch Test at 400°F

| Product | Reaction Product of Example I | Reaction Product of Example II | Blank |
|---|---|---|---|
| 100% cotton | slight | slight | slight |
| 50/50 Blend Polyester/cotton | moderate | slight | slight |

Softness of Hand

This test was performed using the 100% cotton fabric samples prepared above. These samples were treated with 3% of the sulfated castor oil substitute from Example I, the sulfated castor oil substitute from Example II and a commercial sulfated castor oil as finishes. A blank sample which was not treated with a sulfated castor oil was also included in this test. The fabric samples were conditioned for 16 hr at 70°F and 50% relative humidity. Then the samples were compared with the blank samples to obtain the results given in Table III below. These results show that the softness of the fabric samples treated with the reaction products of Examples I and II are equal to the softness of a fabric sample treated with commercial sulfated castor oil.

TABLE III

| Product | Reaction Product of Example I | Reaction Product of Example II | Commercial Sulfated Castor Oil | Blank |
|---|---|---|---|---|
| Softness of Hand | very soft | very soft | very soft | firm |

Fabric Whiteness 90 hr Yellowing Test

This test was performed using the 100% cotton, 50/50 cotton/polyester blend and 100% nylon fabric samples prepared above. These samples had 3% of the sulfated castor oil substitute from Examples I and II as finishes.

Each 4 in × 12 in cut fabric samples finished with the sulfated castor oil substitutes of Examples I and II as well as a blank sample which was not treated with a sulfated castor oil substitute were placed in a pint jar with 1 ml of distilled water. The jars were tightly sealed using Mylar Film as liners for the lids. The jars were placed in an oven at 200°F and were arranged so that there was adequate spacing of the jars in the oven to assure proper air circulation and to prevent localized heating. The jars were removed from the oven after 90 hrs of heating at a constant temperature of 200°F, and allowed to cool. The fabric samples were removed from the jars and the fabric whiteness was measured with a Hunter D-40 Reflectometer using AATCC Test Method 110–1968 to obtain the reflectance values shown in Table IV below. These results show the Reaction Products of Examples I and II yellow less than commercial sulfated castor oil when applied as finishes to cotton and nylon.

TABLE IV

Fabric Whiteness 90 hr Yellowing Test[a]

| Product | Reaction Product of Example I | Reaction Product of Example II | Commercial Sulfated Castor Oil |
|---|---|---|---|
| 100% Cotton | 41.4 | 29.1 | 22.0 |
| 50/50 Blend Polyester/cotton | 5.5 | 10.4 | 10.5 |
| 100% Nylon | 13.2 | 22.1 | 12.0 |

[a] Reflectance values are relative. As the values increase, whiteness of the fabric increases.

While the invention has been described with reference to certain specific embodiments thereof, it is understood that it is not to be so limited since alterations and changes may be made therein which are within the full and intended scope of the appended claims.

What is claimed is:

1. A composition comprising a sulfated mixture of
   a. from about 10% to about 70% by weight of at least one aliphatic alcohol having from about 4 to about 30 carbon atoms, and
   b. from about 90% to about 30% by weight of at least one unsaturated oil excluding castor oil.

2. The composition of claim 1 wherein the unsaturated oil is a vegetable oil.

3. The composition of claim 1 wherein the aliphatic alcohol is a mixture of $C_{8-16}$ Oxo process bottom alcohols and the unsaturated oil is mustard seed oil.

4. The composition of claim 3 wherein 50 parts by weight of mustard seed oil and 50 parts by weight of the Oxo process alcohols are present.

5. The composition of claim 1 wherein the aliphatic alcohol is a mixture of $C_{8-16}$ Oxo process bottom alcohols and the unsaturated oil is peanut oil.

6. The composition of claim 5 where 70 parts by weight of peanut oil and 30 parts by weight of the Oxo process alcohols are present.

7. A process comprising the step of applying a softening amount of the composition of claim 1 as a finish to a textile material.

8. A textile material produced by the process of claim 7.

* * * * *